(12) United States Patent
Strom et al.

(10) Patent No.: US 10,574,817 B2
(45) Date of Patent: Feb. 25, 2020

(54) METHODS OF USING CALL FOR SERVICE DATA IN AN ANALYTIC CAPACITY

(71) Applicant: Research Triangle Institute, Research Triangle Park, NC (US)

(72) Inventors: Kevin Jay Strom, Research Triangle Park, NC (US); Mark William Pope, Research Triangle Park, NC (US); Maurice A Martin, Research Triangle Park, NC (US); Christopher Michael Griggs, Research Triangle Park, NC (US); James Illiad Rineer, Research Triangle Park, NC (US); Crystal Majors Daye, Research Triangle Park, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 0 days.

(21) Appl. No.: 14/775,683

(22) PCT Filed: Mar. 14, 2014

(86) PCT No.: PCT/US2014/027128
§ 371 (c)(1),
(2) Date: Sep. 12, 2015

(87) PCT Pub. No.: WO2014/152255
PCT Pub. Date: Sep. 25, 2014

(65) Prior Publication Data
US 2016/0036974 A1   Feb. 4, 2016

Related U.S. Application Data

(60) Provisional application No. 61/785,217, filed on Mar. 14, 2013.

(51) Int. Cl.
*H04M 3/00* (2006.01)
*H04W 4/02* (2018.01)
*H04M 3/51* (2006.01)

(52) U.S. Cl.
CPC ....... *H04M 3/5116* (2013.01); *H04M 3/5191* (2013.01)

(58) Field of Classification Search
CPC ........ G06Q 30/02; G06Q 10/06; G06Q 10/10; G06Q 50/26; H04M 11/00; H04M 7/14;
(Continued)

(56) References Cited

U.S. PATENT DOCUMENTS

| 5,889,845 A | 3/1999 | Staples et al. |
| 9,037,108 B1 * | 5/2015 | Delatorre ................ H04W 4/90 455/404.1 |

(Continued)

FOREIGN PATENT DOCUMENTS

| KR | 20060009070 A | 1/2006 |
| KR | 20120125092 A | 11/2012 |

OTHER PUBLICATIONS

Form PCT/IB/326 (IPRP Transmittal Notification) dated Sep. 24, 2015 for PCT application No. PCT/US2014/027128.
(Continued)

*Primary Examiner* — Khawar Iqbal
(74) *Attorney, Agent, or Firm* — NK Patent Law

(57) ABSTRACT

Computer-implemented methods and computer-readable media are disclosed for processing call-for-service data to facilitate queries and reports to enhance usefulness of call-for-service data. In one embodiment, a computer-implemented method performable by a computer system includes receiving at a computer system data for a plurality of calls-for-service. Individual data for an individual call-for-service includes one or more fields storing information
(Continued)

relating to the call-for-service. Based on the information stored within the one or more fields of the individual data, one or more supplemental classifiers are automatically identified. The one or more supplemental classifiers are associated with the individual data. The one or more supplemental classifiers associated with the individual data enable the individual call-for-service to be identified when the one or more supplemental classifiers match one or more specified criteria.

18 Claims, 11 Drawing Sheets

(58) Field of Classification Search
CPC .. H04M 3/5191; H04M 11/10; H04M 3/5116; H04W 4/22
USPC ............................ 455/404.1, 414.1; 340/540
See application file for complete search history.

(56) References Cited

U.S. PATENT DOCUMENTS

| | | | |
|---|---|---|---|
| 9,148,771 B2* | 9/2015 | Zentner | H04W 4/90 |
| 9,292,805 B2* | 3/2016 | Rochet | G06Q 50/10 |
| 9,374,696 B2* | 6/2016 | Singer | H04W 4/90 |
| 2005/0163104 A1 | 7/2005 | Christensen et al. | |
| 2011/0281547 A1 | 11/2011 | Cordero | |
| 2012/0207286 A1* | 8/2012 | Clawson | H04M 3/493 |
| | | | 379/45 |
| 2012/0210271 A1* | 8/2012 | Clawson | H04M 3/5116 |
| | | | 715/780 |
| 2012/0256745 A1* | 10/2012 | Piett | G06Q 30/02 |
| | | | 340/540 |
| 2013/0203039 A1* | 8/2013 | Piett | G09B 7/00 |
| | | | 434/362 |
| 2013/0246041 A1* | 9/2013 | Costa | G06F 17/289 |
| | | | 704/2 |
| 2013/0346440 A1* | 12/2013 | Alon | G06Q 50/265 |
| | | | 700/769 |
| 2014/0023064 A1* | 1/2014 | Schulzrinne | H04M 3/5116 |
| | | | 370/352 |
| 2014/0094134 A1* | 4/2014 | Balthasar | H04W 4/90 |
| | | | 455/404.1 |
| 2014/0155018 A1* | 6/2014 | Fan | H04W 72/048 |
| | | | 455/404.1 |
| 2014/0192964 A1* | 7/2014 | Bhogal | H04M 3/5116 |
| | | | 379/45 |
| 2015/0079924 A1* | 3/2015 | Lieu | H04W 4/90 |
| | | | 455/404.2 |
| 2017/0155763 A1* | 6/2017 | Bekanich | H04M 3/42382 |

OTHER PUBLICATIONS

Form PCT/IB/373 (IPRP that includes the PCT/ISA/237—Written Opinion) dated Sep. 15, 2015 for PCT application No. PCT/US2014/027128.

* cited by examiner

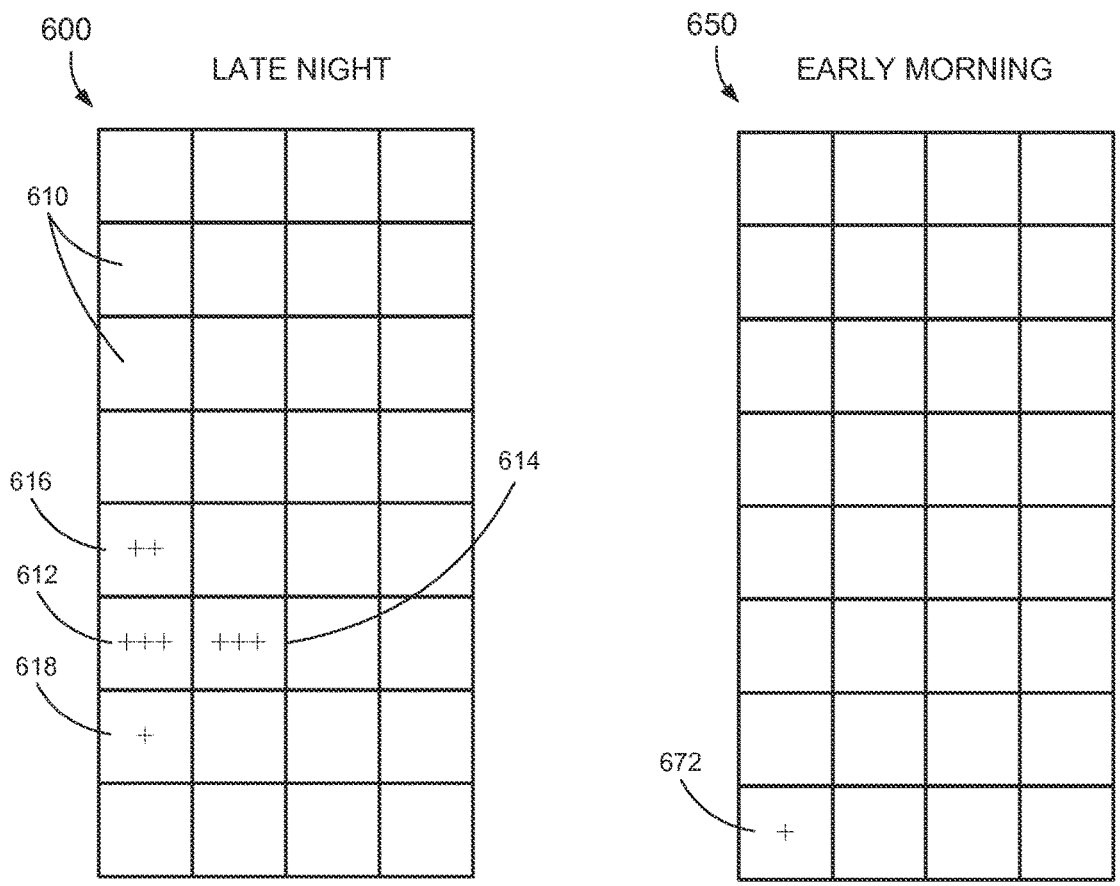
FIG. 6A  FIG. 6B
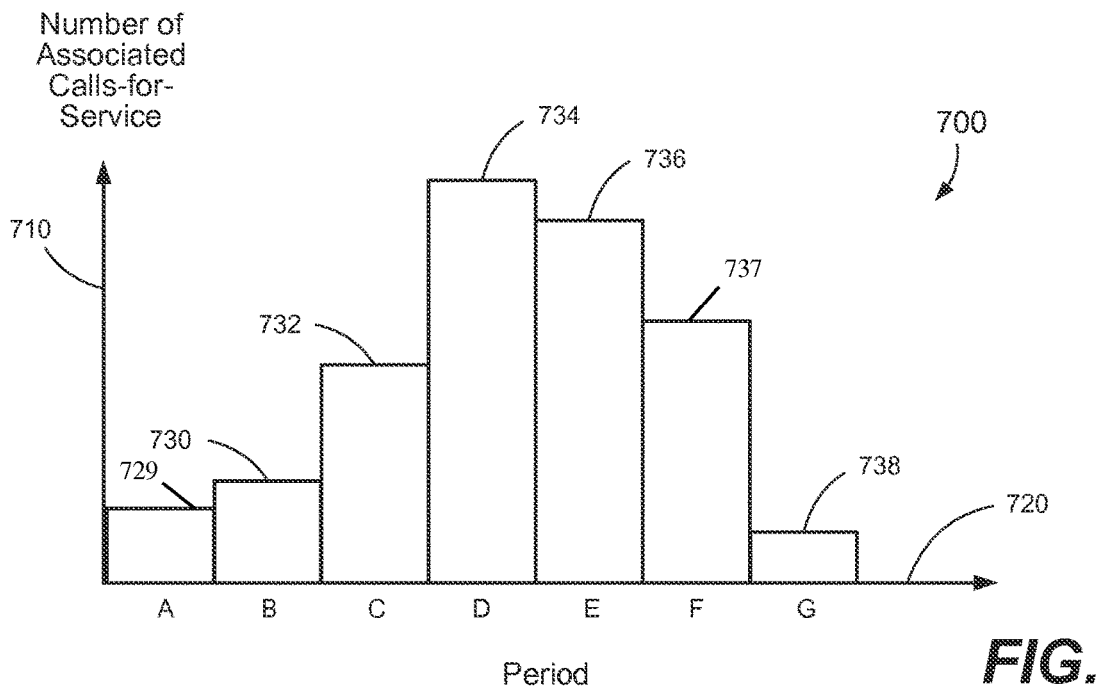
FIG. 7

1100

```
┌─────────────────────────────────────────┐
│ Receive at a computer system data for a │
│ plurality of calls-for-service where    │
│ individual data for an individual       │
│ call-for-service of the plurality of    │
│ calls-for-service includes one or more  │
│ unstructured fields storing information │
│ relating to the call-for-service        │
│                                    1110 │
└─────────────────────────────────────────┘
                    ↓
┌─────────────────────────────────────────┐
│ Based on information stored within the  │
│ one or more unstructured fields,        │
│ automatically identify one or more      │
│ supplemental classifiers                │
│                                    1120 │
│  ┌───────────────────────────────────┐  │
│  │ Analyze the information stored    │  │
│  │ within the one or more            │  │
│  │ unstructured fields using         │  │
│  │ natural language processing       │  │
│  │                            1130   │  │
│  └───────────────────────────────────┘  │
│                  ↓                      │
│  ┌───────────────────────────────────┐  │
│  │ Identify the one or more          │  │
│  │ supplemental classifiers based on │  │
│  │ one or more terms potentially     │  │
│  │ stored in the one or more         │  │
│  │ unstructured fields that have     │  │
│  │ been empirically determined to    │  │
│  │ indicate relevance of the one or  │  │
│  │ more supplemental classifiers     │  │
│  │                            1140   │  │
│  └───────────────────────────────────┘  │
└─────────────────────────────────────────┘
                    ↓
┌─────────────────────────────────────────┐
│ Associate the one or more supplemental  │
│ classifiers with the individual data    │
│ for the individual call-for-service in  │
│ supplemented call for service data      │
│                                    1150 │
└─────────────────────────────────────────┘
```

1210 Access supplemented call-for-service data, where the supplemented call for service data includes individual data for each of a plurality of calls-for-service in which the individual data has been associated with one or more supplemental classifiers based on the information stored within one or more fields of the individual data

1220 Access crime incident data, where the crime incident data that is at least partially coextensive with the supplemented call for service data in geographical and temporal coverage

1230 Receive a selection of one or more types of crime incidents represented in at least one of the one or more supplemental classifiers and the crime incident data

1240 Receive a selection of one or more particular locations

1250 Receive a selection of one or more times of interest or ranges of time of interest

1260 Generate one or more averages for the one or more types of crime incidents represented in the at least one of the one or more supplemental classifiers and the crime incident data for the particular locations and the times of interest or ranges of time of interest

1270 Generate a predictive model based on the one or more averages, where the model is configured to be predictive of future crime incidents

*FIG. 12*

METHODS OF USING CALL FOR SERVICE DATA IN AN ANALYTIC CAPACITY

CROSS-REFERENCE TO RELATED APPLICATIONS

This application is a 371 National Phase Application of United States Patent Cooperation Treaty Application No. PCT/US14/27128 filed on Mar. 14, 2014, which claims priority to U.S. Provisional Patent Application No. 61/785,217, filed on Mar. 14, 2013, the entire contents of which are incorporated by reference herein.

GOVERNMENT RIGHTS IN THE INVENTION

This invention was made with government support under Award Number 2009-SQ-B9-K010 made by the United States Department of Justice. The government has certain rights in the invention.

FIELD OF THE INVENTION

The present invention relates to computer-implemented methods and computer-readable storage media storing instructions to enhance access to data acquired in calls-for-service, such as "911" emergency calls in most of North America, "112" emergency calls in much of Europe, and "999" emergency calls in other countries, and other emergency and non-emergency calls.

BACKGROUND

As is the case in many facets of industry, education, government, and other institutions, computers have greatly facilitated the work of law enforcement agencies. For example, when a police officer witnesses an operator of a motor vehicle commit a traffic violation or for some other reason is suspicious of a motor vehicle, the officer can transmit the vehicle's license plate number to the officer's headquarters via radio, telephone, or a computer on-board the vehicle. Law enforcement computers can search criminal databases to determine if the car has been stolen, if the owner is the subject of an active arrest warrant, if the owner or suspected operator may pose a risk of harm to the officer or others. In addition, when police are able to collect fingerprints or secure an image of a person who was present at a crime scene (i.e., a photograph from a security camera or a drawing prepared by a police artist), law enforcement computers can seek persons with corresponding fingerprint records or facial recognition data to identify perpetrators or material witnesses. Such computer applications have provided a great benefit to law enforcement.

On the other hand, computers have not been used to their fullest advantage in all aspects of law enforcement. For example, when a call-for-service is received by police agencies, such as in the form of a 911 emergency call or a non-emergency call, the information provided by the caller and/or collected by the operator receiving the call is frequently entered directly into a computer system. The information recorded may include a time at which the call is received, a location from which the call is placed, and similar details about the context of the call. The operator receiving the call may assign a code to the call that the operator believes represents the nature of the call-for-service. Also, the operator may enter other information provided by the caller that provides some details about the circumstances of the call. For example, if the caller is reporting disorderly conduct associated with an alcohol-related disturbance involving youth, relevant narrative may be entered describing the nature of the call. The data entered in the computer system may be used to dispatch appropriate personnel and/or to track how many such calls have been received.

However, call-for-service data arguably is underutilized by law enforcement agencies. While some of the data collected in structured fields of the data, such as the time of a call, the assigned code indicating the type of the reported offense may be processed to yield some reports, the totality of the information received in such calls may not be used to fully analyze the stored information to help in planning to respond to the incidence of crime or to attempt to decrease or prevent the incidence of crime. Analyzing the data may require manpower or computing resources that law enforcement agencies do not have or cannot afford.

Thus, it would be desirable to provide methods to enable workable affordable tools to enable law enforcement agencies to make better use of data collected from calls-for-service.

SUMMARY

The present disclosure relates to computer-implemented methods and computer-readable media for processing call-for-service data to facilitate queries and reports to enhance usefulness of call-for-service data. Call-for-service data is preprocessed to assign supplemental classifiers to the data. The supplemental classifiers may include range classifiers to associate calls with particular time blocks or ranges, such as late nights, early mornings, weekend nights, etc., to help analyze at which times and at which locations certain types of calls may be reported. In addition, supplemental classifiers may be assigned to categorize certain types of calls with certain types of behavior. For example, empirical study of narrative data (usually stored in unstructured fields) received in calls categorized as suspicious person calls may be determined to indicate a threat of one or more types of crimes relating to sale and distribution of drugs or other crimes against property or against persons; these calls may be assigned a supplemental classifier to reflect a potential risk of those crimes.

A simple free-text query on collected call-for-service data may not be efficient, practical, or yield the results one is expecting. Such studies may require computing resources or manpower that local law enforcement agencies do not possess. By contrast, queries on the supplemental classifiers generated in pre-processing data as previously described may be used in concert with crime incident data to enable more thorough and meaningful analysis of the call-for-service data that may be used to predict and prevent future crimes and injurious behavior.

According to an embodiment of the present disclosure, a computer-implemented method performable by a computer system includes receiving at a computer system data for a plurality of calls-for-service. Individual data for an individual call-for-service includes one or more fields storing information relating to the call-for-service. Based on the information stored within the one or more fields of the individual data, one or more supplemental classifiers are automatically identified. The one or more supplemental classifiers are associated with the individual data. The one or more supplemental classifiers associated with the individual data enable the individual call-for-service to be identified when the one or more supplemental classifiers match one or more specified criteria.

According to another embodiment of the present disclosure, a computer-implemented method performable by a computer system includes receiving at a computer system data for a plurality of calls-for-service. Individual data for an individual call-for-service of the plurality of calls-for-service includes one or more unstructured fields storing information relating to the call-for-service. Based on the information stored within the one or more unstructured fields, one or more supplemental classifiers are automatically identified by analyzing the information stored within the one or more unstructured fields using natural language processing and identifying the one or more supplemental classifiers based on one or more terms potentially stored in the one or more unstructured fields that have been empirically determined to indicate relevance of the one or more supplemental classifiers. The one or more supplemental classifiers are associated with the individual data for the individual call-for-service in supplemented call for service data.

According to still another embodiment of the present disclosure, a computer-implemented method performable by a computer system includes accessing supplemented call-for-service data, where the supplemented call for service data includes individual data for each of a plurality of calls-for-service in which the individual data has been associated with one or more supplemental classifiers based on the information stored within one or more fields of the individual data. The method also includes accessing crime incident data, where the crime incident data is at least partially coextensive with the supplemented call for service data in geographical and temporal coverage. A selection of one or more types of crime incidents represented in at least one of the one or more supplemental classifiers and the crime incident data is received. Selections of one or more particular locations and one or more times of interest or ranges of time of interest are also received. One or more averages are generated for the one or more types of crime incidents represented in the at least one of the one or more supplemental classifiers and the crime incident data for the particular locations and the times of interest or ranges of time of interest.

According to a further embodiment, a non-transitory computer-readable storage medium storing instructions executed by a computer system includes instructions to receive data for a plurality of calls-for-service. Individual data for an individual call-for-service of the plurality of calls-for-service includes one or more unstructured fields storing information relating to the call-for-service. Based on the information stored within the one or more unstructured fields, one or more supplemental classifiers are automatically identified by analyzing the information stored within the one or more unstructured fields using natural language processing and identifying the one or more supplemental classifiers based on one or more terms potentially stored in the one or more unstructured fields that have been empirically determined to indicate relevance of the one or more supplemental classifiers. The one or more supplemental classifiers are associated with the individual data for the individual call-for-service in supplemented call for service data.

According to a still further embodiment of the present disclosure, a non-transitory computer-readable storage medium storing instructions executed by a computer system includes instructions to access supplemented call-for-service data, where the supplemented call for service data includes individual data for each of a plurality of calls-for-service in which the individual data has been associated with one or more supplemental classifiers based on the information stored within one or more fields of the individual data. Instructions are also included to access crime incident data, where the crime incident data is at least partially coextensive with the supplemented call for service data in geographical and temporal coverage. Instructions are included to receive a selection of one or more types of crime incidents represented in at least one of the one or more supplemental classifiers and the crime incident data. Instructions are also included to receive selections of one or more particular locations and one or more times of interest or ranges of time of interest. Instructions are included to generate one or more averages are generated for the one or more types of crime incidents represented in the at least one of the one or more supplemental classifiers and the crime incident data for the particular locations and the times of interest or ranges of time of interest.

Other aspects, features and embodiments of the disclosure will be more fully apparent from the ensuing disclosure and appended claims.

BRIEF DESCRIPTION OF THE DRAWINGS

FIGS. 6A and 6B are reports generated based on queries or requests for reports from supplemented call-for-service data to generate maps representing numbers of calls-for-service related to supplemental classifiers that meet stated criteria;

FIG. 7 is a graphical report representing numbers of calls-for-service generated based on queries or requests for reports from supplemented call-for-service data that meet stated criteria;

FIG. 11 is a flow diagram of another particular embodiment of a method performable by a computing system to associate call-for-service data with one or more supplemental classifiers to facilitate queries and reports for calls-for-service relating to activities of interest; and FIG. 12 is a flow diagram of a particular embodiment of a method performable by a computing system to generate a predictive model of future crime incidents for one or more particular locations and one or more times or ranges of times based on call-for-service data associated with one or more supplemental classifiers and crime incident data.

DETAILED DESCRIPTION

The present disclosure relates to computer-implemented methods and computer-readable media for processing call-for-service data to facilitate queries and reports to enhance the usefulness of call-for-service data. Call-for-service data is preprocessed to assign supplemental classifiers to the data. The supplemental classifiers may include range classifiers to associate calls with particular time blocks or ranges, such as late nights, early mornings, weekend nights, etc., to help analyze and predict at which times and at which locations certain types of calls may be reported. In addition, supplemental classifiers may be assigned to categorize certain types of calls as reporting certain types of criminal behavior. For example, empirical study of narrative data (stored in unstructured fields) received in calls categorized as suspicious person calls may be determined to indicate a threat of one or more types of crimes relating to sale and distribution of drugs or other crimes against property or against persons; these calls may be assigned a supplemental classifier to reflect a risk of those crimes.

Figure 1:
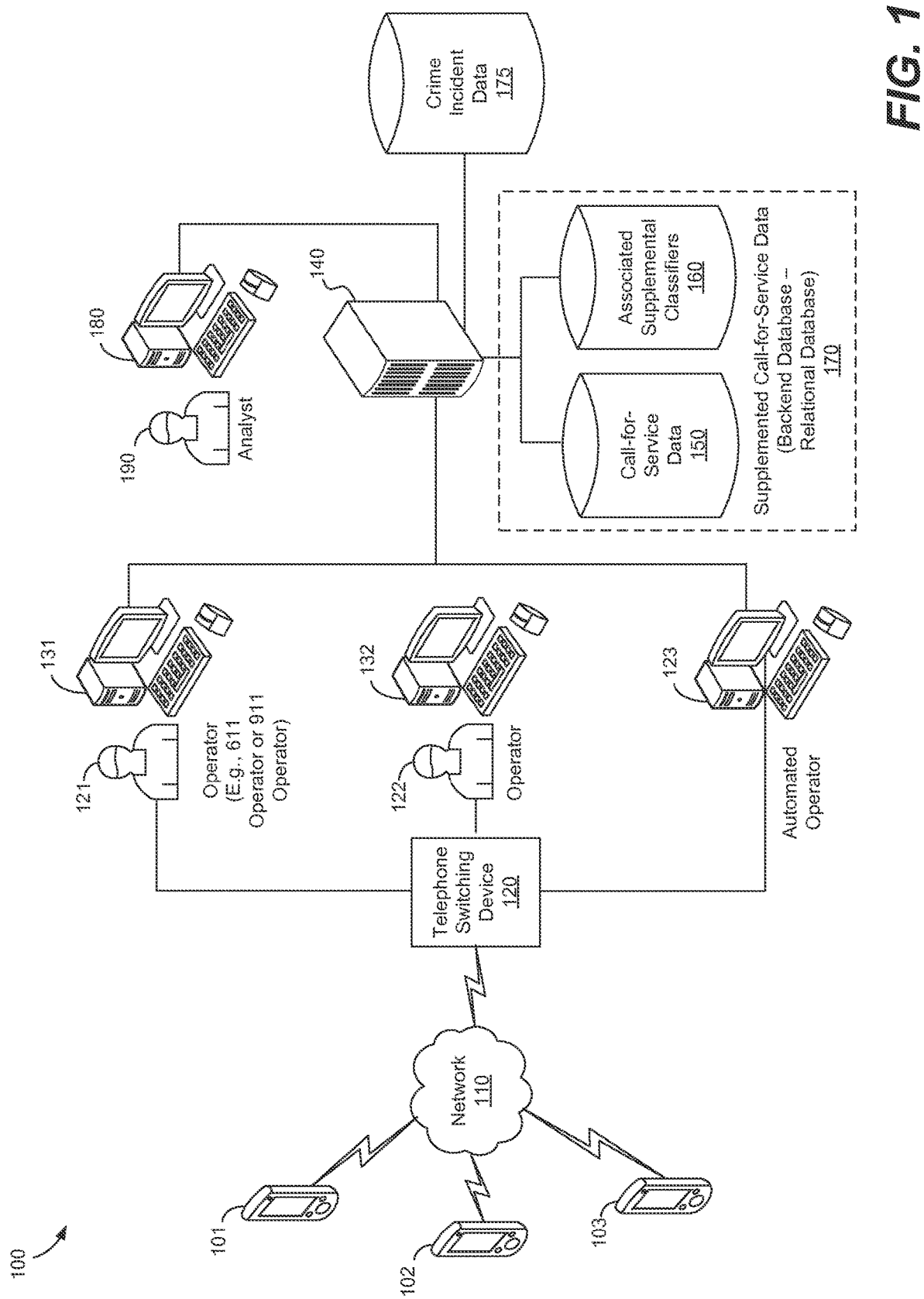
FIG. 1 is a schematic diagram of an embodiment of a system for capturing and processing call-for-service data, and for generating reports, including predictive models, from processed call-for-service data and crime incident data.

FIG. 1 is a schematic diagram of a call-for-service system 100 employing an embodiment of the present disclosure to facilitate analysis of call-for-service data. In the call-for-service system 100, calls-for service are placed from telephones 101-103 over a network 110 to a telephone switching device 120, such as a private branch exchange, to one or more operators 121-123. Call-for-service data is entered via workstations, such as terminals or workstations 121 and 122, and the data is stored as call-for-service data 150 on storage within or accessible by a computer 140. The computer 140 where the data is stored may be a personal computer, a workstation, or a server computer. In particular embodiments, the call-for-service data 150 may be stored in a relational database, such as a structured query language (SQL) database to permit flexible queries on the call-for-service data 150.

According to embodiments of the present disclosure, the call-for-service data 150 is pre-processed by the computer 140 to associate supplemental classifiers 160 with the call-for-service data 150. The associated supplemental classifiers 160 may be maintained in separate database tables and joined with the call-for-service data 150, so as not to affect the original call-for-service data 150. Alternatively, the call-for-service data 150 may be copied into another database in which the associated supplemental classifiers 160 also are stored. In either form, the call-for-service data 150 and the associated supplemental classifiers 160 constitute supplemented call-for-service data 170.

Figure 9:
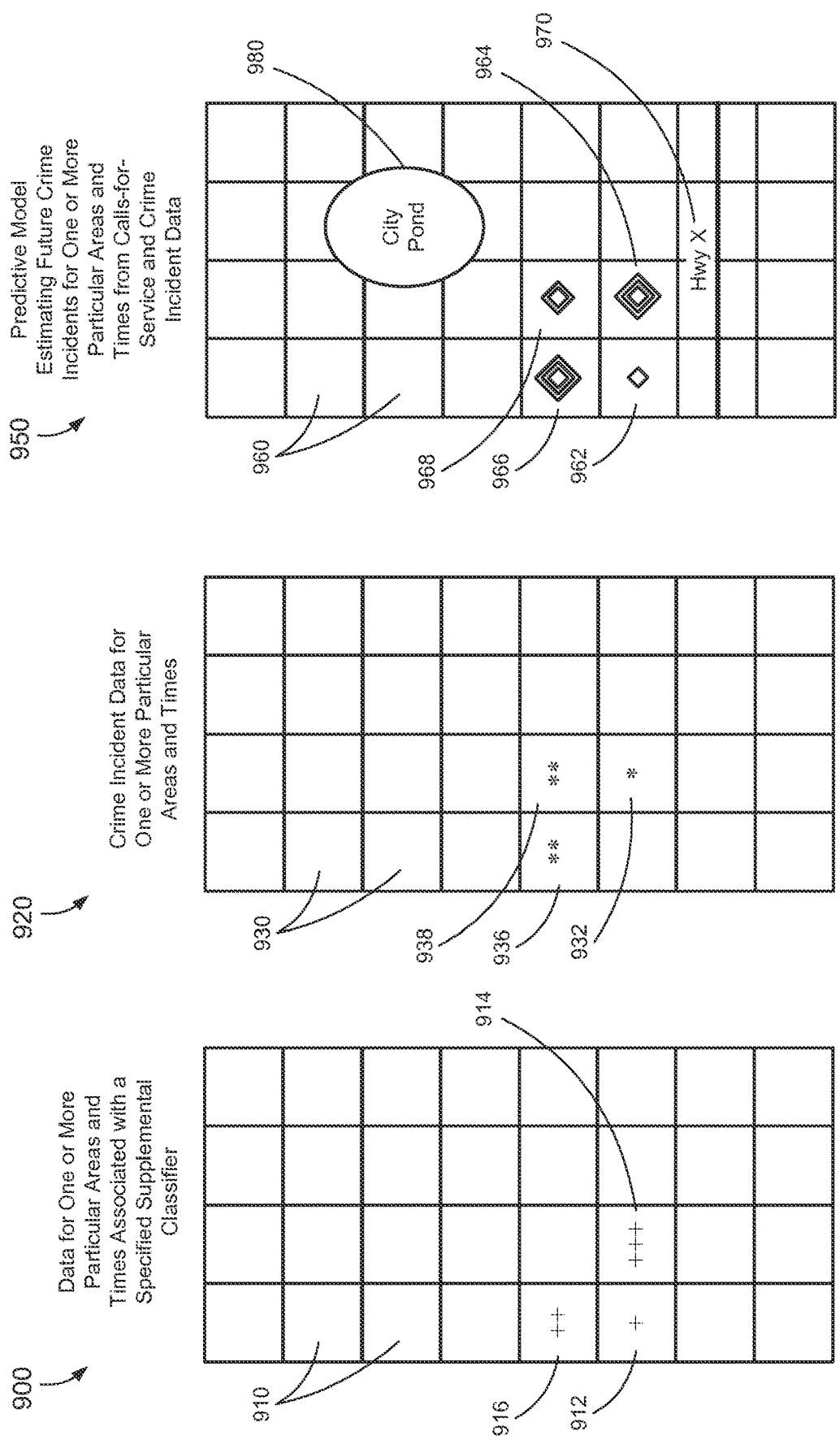
FIG. 9A is a map representing data for one or more particular types of calls-for-service for particular areas at a particular time associated with a specified supplemental classifier.
FIG. 9B is a map representing crime incident data for the same particular areas and time as represented in FIG. 9A with the calls-for-service data.
FIG. 9C is a predictive model representing an anticipated number of crime incidents to occur in the particular areas at a particular future time based on combining previously-collected calls-for-service data of FIG. 9A and the crime incident data of FIG. 9B.

The supplemented call-for-service data 170 may be accessed by an analyst 190 via a workstation 180 in communication with the computer 140 or by input output devices directly attached to the computer 140. Using the supplemented call-for-service data 170, the analyst 190 can generate or view reports derived from the call-for-service data 150 that may be used to better analyze the data for the sake of better and safer user of law enforcement resources. In addition to the supplemented call-for-service data 170, crime incident data 175 also may be accessed via a workstation 180. The crime incident data 175 includes data regarding the reporting and/or investigation of previously-committed crimes. The crime incident data 175 thus may include, for example, robberies, offenses against persons, and various other crimes that have been reported as having occurred at particular locations and at particular times. As further explained below with reference to FIG. 9, associated supplemental classifiers 160 assigned to the call-for-service data 150 and the crime incident data 175 may be used collectively to predict a number of crime incidents that may be expected to occur at a specified future location and time period.

Referring to FIG. 1 in more detail, once calls are received from telephones 101-103, call-for-service operators 121 and 122 may enter information received from the callers or derived from the callers on workstations 131 and 132, respectively. The calls-for-service may include 911 calls, 311 calls, 991 calls, 112 calls, or other emergency or non-emergency calls. The data entered by the operators 121 and 122, as further described below, may include particular items of information suited for structured fields, such as the time and date of the incident being reported, the location from which the call is placed, etc. The data entered also may include narrative information provided by the caller that is entered into one or more unstructured fields or text fields provided by the call-for-service capture system. The narrative information may include details that the structured fields are not configured to accommodate. In many cases, the data is entered by the call-for-service operators 121 and 122 via the workstations 131 and 132, respectively. However, it also is possible that an automated operator 123 may use speech-to-text conversion to record the information provided by the caller; whether a call-for-service operator participates in the call or not to obtain information from the caller, to dispatch help, etc., the automated operator may be used to facilitate the capture of information from the caller.

For example, consider a case where a call-for-service is received related to a suspicious person in the area from which the call is placed. The caller may be calling to report a suspicious person repeatedly walking around neighborhood, videotaping and taking pictures of houses and cars. The caller may also report the same individual sitting in a parked car, standing on a street corner, etc.

Figure 2:
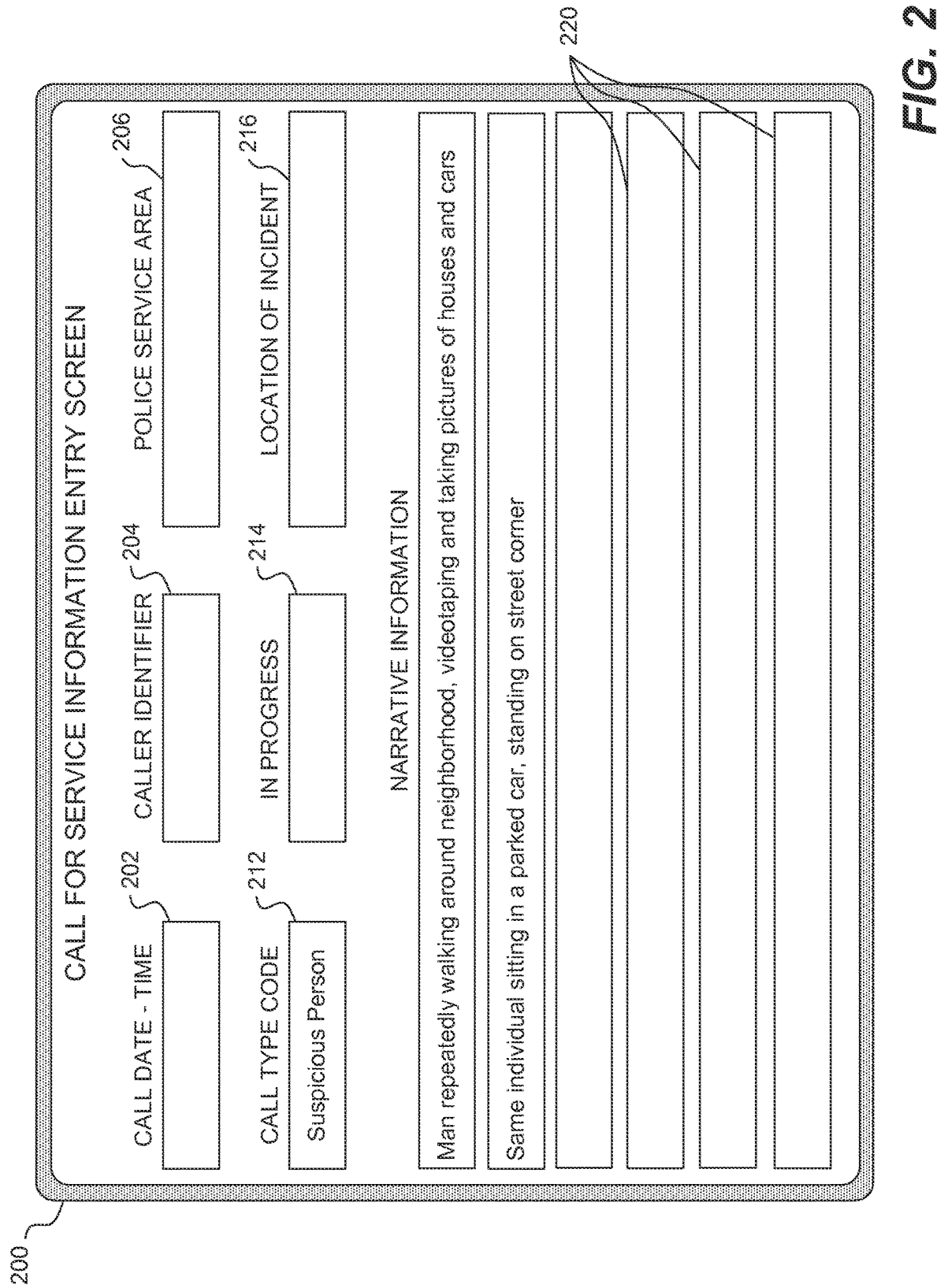
FIG. 2 is a call-for-service data capture screen for receiving information in structured and unstructured fields for subsequent processing according to embodiments of the present disclosure.

Referring to FIG. 2, a call-for-service input screen 200 includes a plurality of structured fields 202, 204, 206, 212, 214, and 216, and a plurality of unstructured fields 220 to store different information received in the call-for-service. The operator may collect information from the caller about the date and the time of the call that is stored in one or more call date and time fields 202. Identification of the person placing the call-for-service may be stored in a caller identifier field 204. A location of the call, potentially defined by the police service or patrol area, may be stored in a police service area field 206. A code to designate the type of call may be stored by the operator in a call type code 212 field. Whether the incident is currently in progress may be stored in an in-progress field 214. A specific location of the incident, such as an address, intersection, etc., may be stored in a location of incident field 216. Additional information, such as the nature of the suspicions, the behavior of the suspicious person, etc., may be stored in the unstructured fields 220 that are configured to receive text to collect narrative information about the incident. In addition to dispatching help, the operator will cause individual call-for-service data received in response to an individual call-for-service, in the call-for-service data 150 at the computer 140, as described with reference to FIG. 1. The call-for-service information is stored, typically contemporaneously with the receipt of the call-for-service.

As previously described, according to embodiments of the disclosure, preprocessing of the call-for-service data 150 enables the call-for-service data 150 for a plurality of calls-for-service, to be used effectively for analysis of crime and in potentially assisting in the prevention or solving of future crimes.

Figure 3:
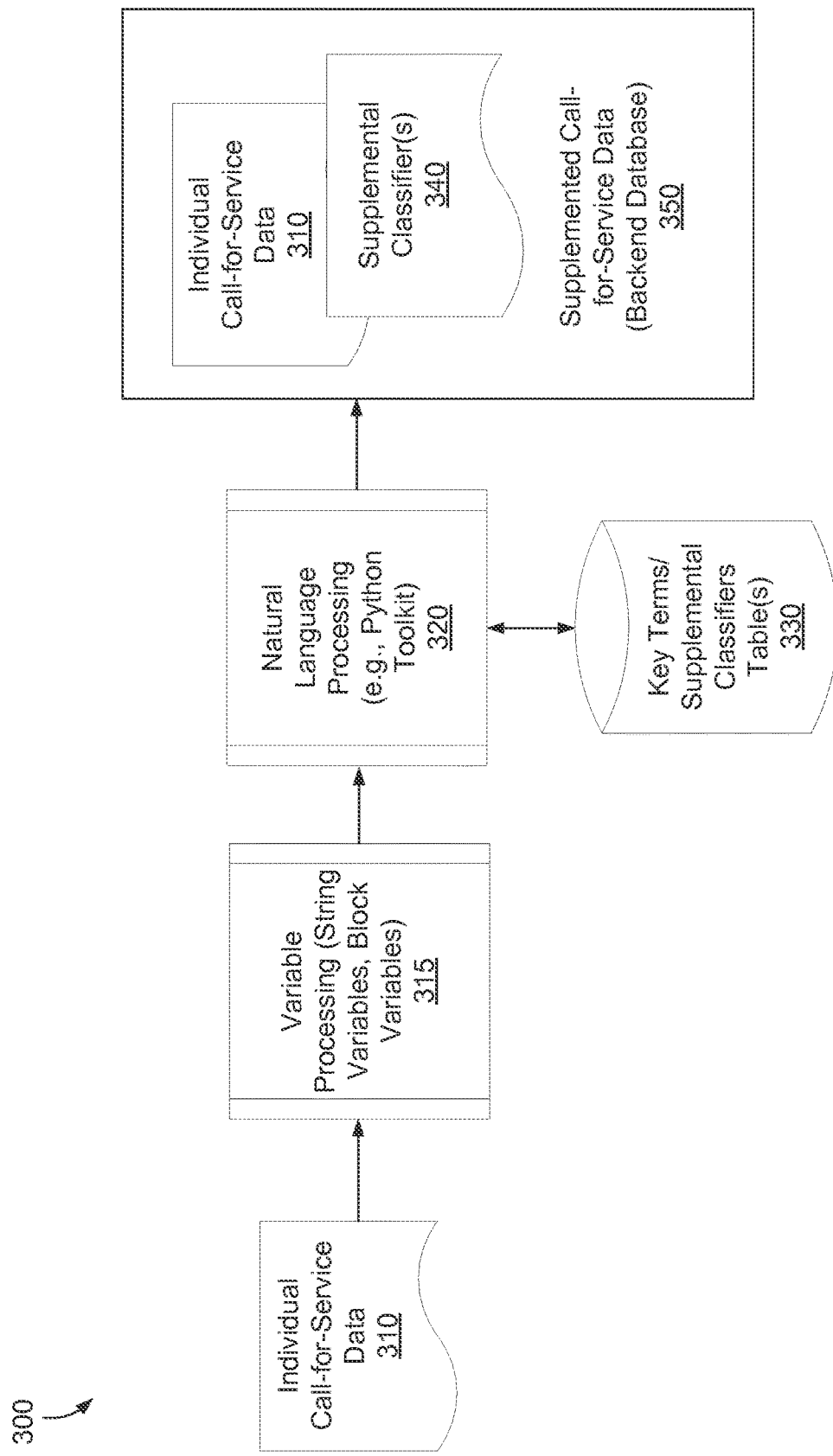
FIG. 3 is a schematic diagram of pre-processing of call-for-service data using natural language processing to assign supplemental classifiers to the call-for-service data.

Referring to FIG. 3, a schematic diagram of a pre-processing system 300 shows how the call-for-service data 150 is pre-processed. Individual call-for-service data 310 is received following the recording of information received in an individual call-for-service. In a particular embodiment, the individual call-for-service data 310 for each individual call-for-service is subjected to variable processing 315 to replace string variables with structured variables and/or range variables. The individual call-for-service data 310 is also processed using natural language processing system 320. The result of the pre-processing system 300 is supplemented call-for-service data, including the individual call-for-service data 310 associated with one or more supplemental classifiers 340 to facilitate analysis of the call-for-service data, as further described below.

The variable processing 315 may include processing to, for example, replace text or string data stored in certain fields with a consistently formatted variable to facilitate queries and analysis of the data. Structured fields in the call-for-service capture system may store data a location of the incident, a time of the incident, a name of a person making the individual call-for-service, a telephone number from which the individual call-for-service is made, and other types of desired or needed information, as previously described with reference to FIG. 2. However, it may be desired to reformat string or text information or to append a supplemental classifier to this information to provide a structured variable to facilitate queries and analysis of the data.

For example, when a string variable specifies a time or date of an incident, the variable processing may replace a string variable with a structured or formatted value to represent the time or the date in a standard, range-searchable format. Similarly, a classifier may be appended to the data to represent the day of the week on which the incident occurred to facilitate queries or searches for incidents that occurred, for example, on weekends as opposed to on weekdays.

Supplemental classifiers may be added to represent ranges of days or times when an incident may have occurred. For example, it may be useful to associate individual call-for-service data with a time range when the incident occurred, such as late night (e.g., between midnight and 4:00 a.m.), early morning (e.g., between 4:00 a.m. and 8:00 a.m.), late morning (e.g., between 8:00 a.m. and 12:00 p.m.), etc. Similarly, it may be useful to associate specific locations with range locations. For example, in addition to including an intersection or address where an incident took place, pre-processing may be performed to add a classifier representing the police service district, beat, or patrol area in which the location occurred.

As a result of the variable processing, queries and analysis may be performed for incidents that occurred, for example, late at night, in a particular service district, and/or late at night in a particular service district, instead of having to perform such queries for delineated ranges of times and/or within delineated ranges of addresses. However, adding range variables instead of replacing the times, locations, etc., in the individual call-for service data 310 enables both range-type query and analysis as well as query and analysis for more specific ranges of time, location, etc.

With regard to the natural language processing at 320, for example, Python-based natural language processing may be used to parse and process the individual call-for-service data 310 in order to identify key terms or phrases that may be used in the unstructured and/or structured fields (FIG. 2) of the individual call-for-service data 310. However, any natural language processing system may be used that is capable of analyzing the data in the individual call-for-service data 310 so as to identify key terms and phrases.

The key terms or phrases for which the individual call-for-service data 310 is parsed may be stored in one or more key terms/supplemental classifiers tables 330. As previously described, previously-received call-for-service data may be studied to identify calls correlated with commission of particular crimes against persons or property, or that involved a risk of harm to law enforcement personnel or others. By empirically studying the data from the previously-received calls, behaviors reported in the previously-received calls-for-service—as may be reflected in terms and phrases that may be stored in recording information about the previously-received—behaviors that indicate commission of particular crimes may be identified.

For example, burglary may be empirically determined to involve loitering or repeated sightings of previously-unknown persons that are engaged in observing homes or property. Other types of crime, such as gambling or drug trafficking may similarly be empirically determined to be associated with certain types of observable behaviors. By empirically identifying behaviors that lead to crimes—and identifying terms phrases that are used in call-for-service data to describe incidents attending or leading to such crimes—tables of key terms and phrases to watch for in call-for-service data may be identified and associated with supplemental classifiers (such as burglary, drug distribution, etc.) to create the one or more key terms/supplemental classifiers tables 330.

Using the key terms/supplemental classifiers tables 330, the natural language processing system 320 can parse the individual call-for-service data 310 to determine if the individual call-for-service data 310 includes terms such that the individual call-for-service data 310 should be associated with one or more supplemental classifiers. When the natural language processing system 320 determines that the individual call-for-service data 310 should be associated with one or more supplemental classifiers 340, the one or more supplemental classifiers 340 are associated with the individual call-for-service data in supplemented call-for-service data 350. The supplemented call-for-service data 350 may be regarded as a "backend database" that, after the fact, is used to analyze previously-received call-for-service data to potentially predict potential future criminal incidents.

Figure 4:
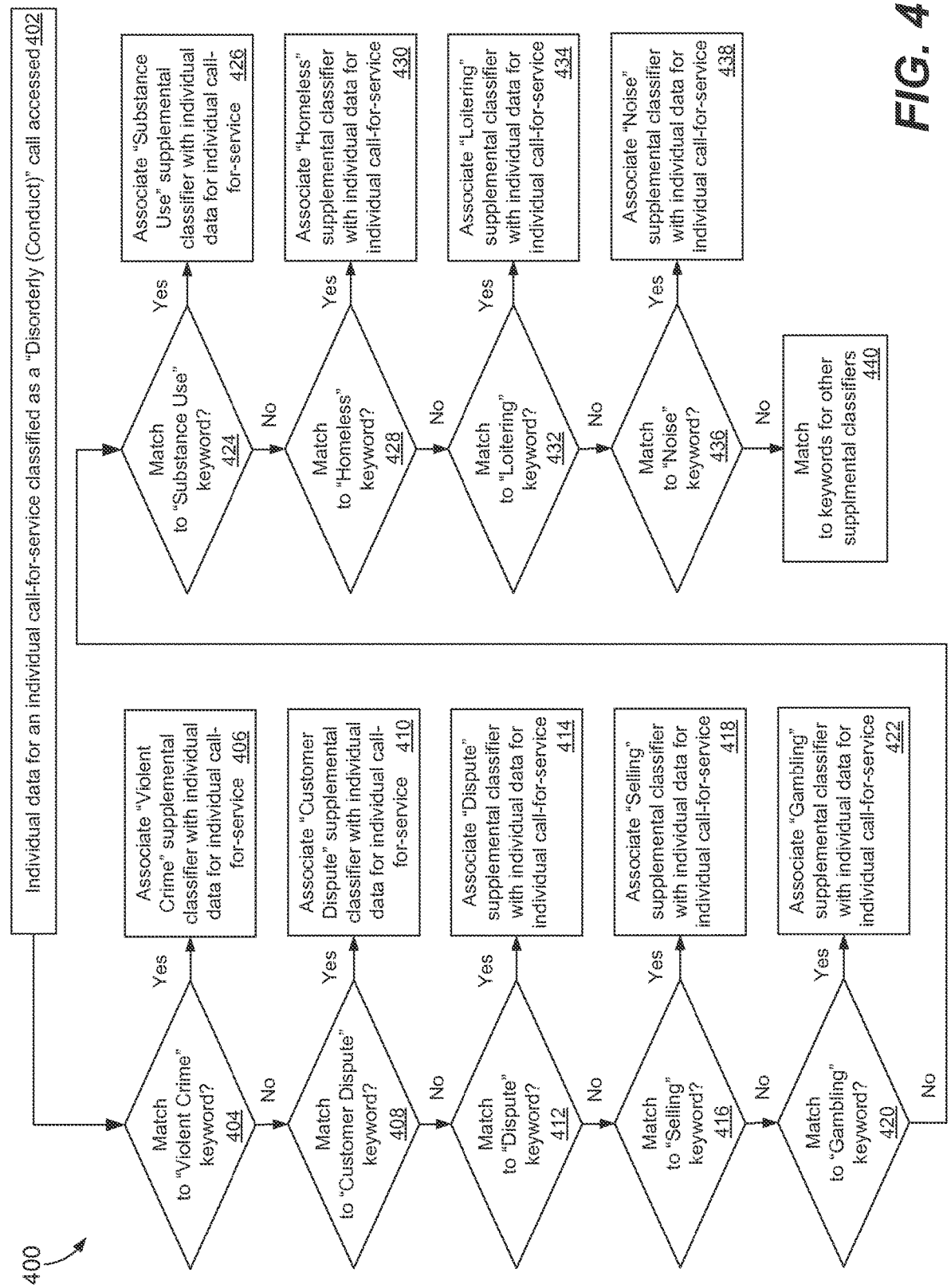
FIG. 4 is a flow diagram of a process for associating supplemental classifiers representing specific types of disorderly conduct calls with particular narrative data indicative of the specific types of disorderly conduct calls.
Figure 5:
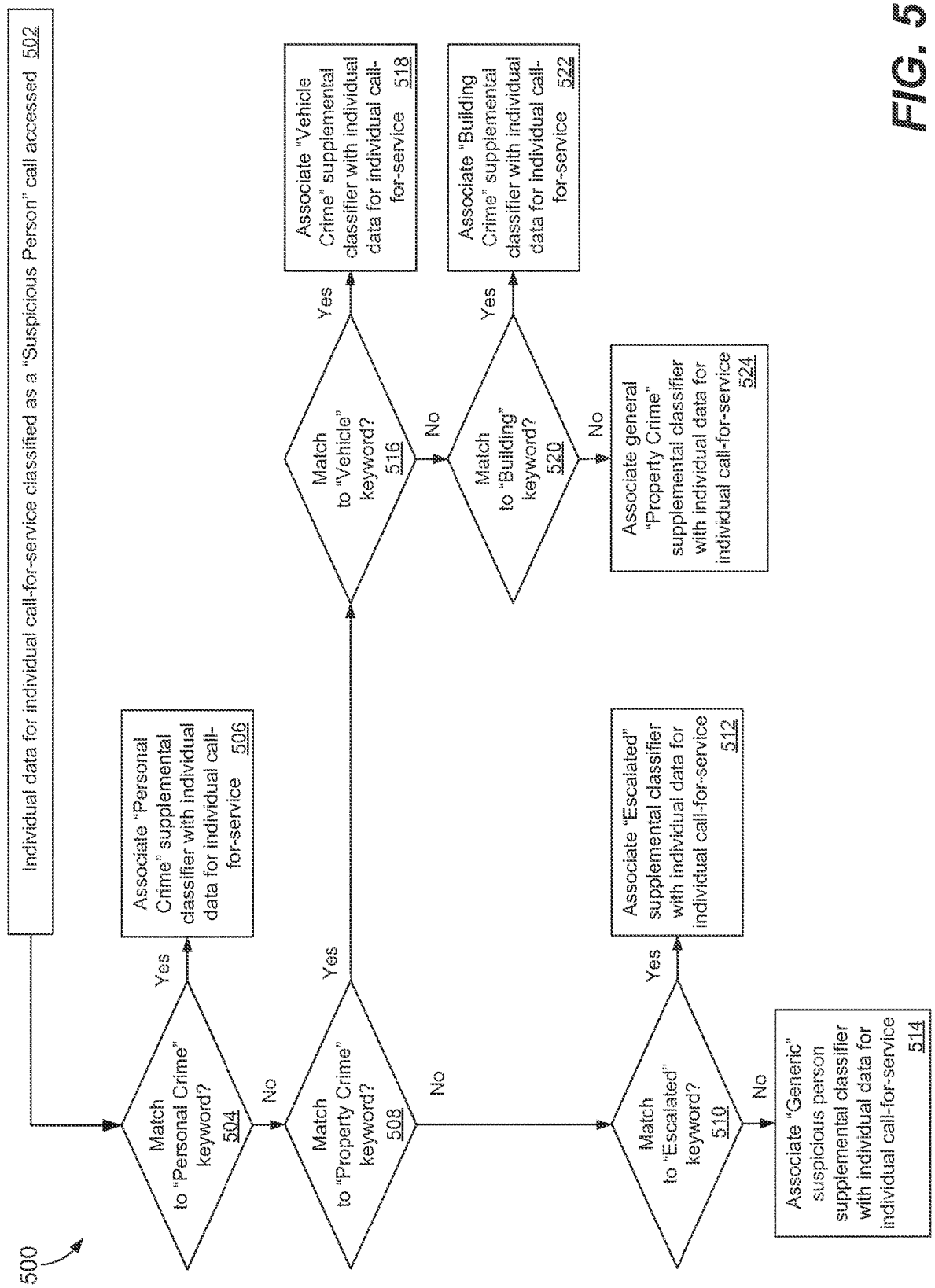
FIG. 5 is a flow diagram of a process for associating supplemental classifiers representing specific types of suspicious persons calls with particular narrative data indicative of the specific types of suspicious person calls.

By way of example, FIGS. 4 and 5 are flow diagrams representing how supplemental classifiers are assigned to individual data for a call-for-service based on information included in the individual data. FIG. 4 is a flow diagram 400 of a process for associating supplemental classifiers representing specific types of disorderly conduct calls with particular narrative data indicative of the specific types of disorderly conduct calls. At 402, individual data for an individual call-for-service classified as a disorderly conduct call is accessed. At 404, it is determined if the individual data includes a keyword that would match the individual data to the "violent crime" supplemental classifier. (Such key words may be stored in a key words or key terms table 330, as described with reference to FIG. 3). Violent crime keywords, derived from empirical study of historical call-for-service data and the outcome of those calls, may include bat, break, chase, escalate, fight, gun, hit, kick, threat, throw, or weapon. If at 404 one of more of those terms is found to have been included in the individual data, at 406, the "violent crime" supplemental classifier is associated with the individual data for the call-for-service.

At 408, it is determined if the individual data includes a keyword that would match the individual data to the "customer dispute" supplemental classifier. Customer dispute keywords may include cab driver, customer dispute, customer, dispute, employee, landlord, manager, or tenant. If at 408 one of more of those terms is found to have been included in the individual data, at 410, the "customer dispute" supplemental classifier is associated with the individual data for the call-for-service.

At 412, it is determined if the individual data includes a keyword that would match the individual data to the "dispute" supplemental classifier. Dispute keywords may include argue, blocking, curse, cuss, dispute, fuss, harass, knock, leave, neighbor dispute, protest, refuse, scream, shout, unwanted, or yell. If at 412 one of more of those terms is found to have been included in the individual data, at 414, the "dispute" supplemental classifier is associated with the individual data for the call-for-service.

At 416, it is determined if the individual data includes a keyword that would match the individual data to the "selling" supplemental classifier. Selling keywords may include buy or sell. If at 416 one of more of those terms is found to have been included in the individual data, at 418, the "selling" supplemental classifier is associated with the individual data for the call-for-service.

At 420, it is determined if the individual data includes a keyword that would match the individual data to the "gambling" supplemental classifier. Gambling keywords may include craps, dice, or gamble. If at 420 one of more of those terms is found to have been included in the individual data, at 422, the "gambling" supplemental classifier is associated with the individual data for the call-for-service.

At 424, it is determined if the individual data includes a keyword that would match the individual data to the "substance use" supplemental classifier. Substance use keywords may include drink, drug, drunk, intox, intoxicate, high, pcp, marijuana, smoke, or urinate. If at 424 one of more of those terms is found to have been included in the individual data, at 426, the "substance use" supplemental classifier is associated with the individual data for the call-for-service.

At 428, it is determined if the individual data includes a keyword that would match the individual data to the "homeless" supplemental classifier. Homeless keywords may include beg, begging, homeless, panhandle, or sleep. If at 428 one of more of those terms is found to have been included in the individual data, at 430, the "homeless" supplemental classifier is associated with the individual data for the call-for-service.

At 432, it is determined if the individual data includes a keyword that would match the individual data to the "loitering" supplemental classifier. Loitering keywords may include hang, loiter, or the frequent misspelling "loiter." If at 432 one of more of those terms is found to have been included in the individual data, at 434, the "loitering" supplemental classifier is associated with the individual data for the call-for-service.

At 436, it is determined if the individual data includes a keyword that would match the individual data to the "noise" supplemental classifier. Noise keywords may include bark, dance, holler, loud, make, music, noise, party, play, or sing. If at 432 one of more of those terms is found to have been included in the individual data, at 434, the "noise" supplemental classifier is associated with the individual data for the call-for-service. If the individual data is not associated with any of the previously-listed supplemental classifiers, at 440, the individual data is compared to keywords for other "disorderly conduct" supplemental classifiers.

The automatic classification of these different types of disorderly calls may be helpful in later use of the call-for-service data. As explained below, the data may be used for predictive modeling of calls-for-service to be expected—and actions that lead to those calls—and certain types of actions may be of greater interest than others. For example, in fighting the illegal drug trade, law enforcement may be more interested in the call-for-service data for calls associated with the "substance use" supplemental classifier. Association of the "substance use" supplemental classifier enhances access to the data for these types of calls-for-service.

For another example, FIG. 5 is a flow diagram 500 of a process for associating supplemental classifiers representing specific types of suspicious person calls with particular narrative data indicative of the specific types of suspicious person calls. The example of FIG. 5 indicates that the individual data classified as a "suspicious person" call may be further classified into groups, then assigned with supplemental classifiers. At 502, individual data for an individual call-for-service classified as a suspicious person call is accessed. At 504, it is determined if the individual data includes a keyword that would match the individual data to the "personal crime" supplemental classifier. (Such key words may be stored in a key words or key terms table 330, as described with reference to FIG. 3). Personal crime keywords, derived from an empirical study of historical call-for-service data and the outcome of those calls, may include terms associated with a person being followed, such as follow, harass, hiding, lerk (a common misspelling of "lurk"), linger, loiter, lurk, pacing, or stalk. If at 504 one of more of those terms is found to have been included in the individual data, at 506, the "personal crime" supplemental classifier is associated with the individual data for the call-for-service.

At 508, it is determined if the individual data includes a keyword that would match the individual data to one or more "property crime" supplemental classifiers. At 516, it is determined if the individual data includes a keyword that would match the individual data to a "vehicle" keyword. Vehicle keywords may include car, drive, driver, engine, parking lot, riding, striped, tag, tamper, garage, tinted, veh, vehicle, or yin. If at 516 one of more of those terms is found to have been included in the individual data, at 518, the "vehicle" supplemental classifier is associated with the individual data for the call-for-service. At 520, it is determined if the individual data includes a keyword that would match the individual data to a "building" keyword. Building keywords may include apartment, apt, backyard, bell, floor, ladder, roof, hall, premises, trespass, lawn, hallway, break ins, building, climb, digging, door, frontyard, gate, home, house, knob, live, porch, rear, window, or yard. If at 520 one of more of those terms is found to have been included in the individual data, at 522, the "building" supplemental classifier is associated with the individual data for the call-for-service. On the other hand, if it is determined at 516 and 520 that the individual data does not include terms that would indicate that the individual data be associated with the vehicle or building supplemental classifiers, at 524, the individual data is associated with a general "property crime" supplemental classifier.

If it was determined at 508 that the individual data did not meet any of the property crime keywords, at 510 it is determined if the individual data includes a keyword that would match the individual data to an "escalated" keyword. Escalated keywords may include doing, gun, heading, knife, suspicious, threat, weapon, argue, bang, blocking, curse, kick, knock, refuse, scare, scream, yell, or wants, terms that indicate that the individual call deals with more than a simple personal crime. If at 510 one of more of those terms is found to have been included in the individual data, at 512, the "escalated" supplemental classifier is associated with the individual data for the call-for-service. On the other hand, if it is determined at 510 that the individual data does not include terms that would indicate that the individual data be associated with the escalated supplemental classifier—which means that the individual data has not been associated with any of the enumerated suspicious person supplemental classifiers—at 514, the individual data is associated with a generic "suspicious person" supplemental classifier Referring back to FIG. 1, once the supplemented call-for-service data 170 (comparable to the supplemented call-for-service data 350 of FIG. 3) is prepared, the analyst 190 may use a workstation, terminal, or input-output devices associated with the computer 140 associated with the supplemented call-for-service data 170 to query and run reports on the data, as further described below. By executing queries against the associated supplemental classifiers 160, rather than free-text searches of the captured data, the analyst 190 may more quickly identify trends that may be used in assigning resources to potentially predict, prevent, and/or solve future crimes.

The reports generated by the system 100 may be generated in response to ad hoc queries presented by the analyst, and the reports also may include standard or regularly-scheduled reports that are generated in response to pre-scripted queries. Ad hoc or pre-scripted queries may request data based on any combination of information included in the one or more structured fields and the one or more unstructured fields as represented by the associated supplemental classifiers 160 in the supplemented call-for-service data 170. It should be appreciated that a query performed on the supplemental classifiers 160 is more efficient than a free-text query on a body of data including all of the unstructured data. In addition, the routine, methodical assignment of supplemental classifiers, as described with reference to FIG. 3, may associate appropriate supplemental classifiers to unstructured data that includes terms that the analyst 190 may not have included in the free text search. Thus, the query on the supplemented call-for-service data 170 may be both more efficient and more accurate in identifying call-for-service data that satisfy desired criteria.

A process of responding to a query or a request for a report generally may include three steps. First, a query including the one or more specified criteria information potentially represented in one or more of the supplemental classifiers is received and/or other structured fields is received. Second, a subset of the plurality of calls-for-service represented in the supplemented call-for-service data that meet the one or more specified criteria included in the query are identified. Third, a report listing data for the subset of the plurality of calls-for-service for which the one or more supplemental classifiers meet the one or more criteria included in the query is generated. The response to the query or the report may be presented in any number of forms or models, as exemplified in FIGS. 6A-6B, 7, and 8A-8B.

FIGS. 6A and 6B represent maps 600 and 650, respectively, that may be presented in generating reports derived from call-for-service data. The maps 600 and 650 represent a same area of interest that is divided into a plurality of sections 610 that may, for example, represent police patrol areas, neighborhood blocks, etc. It will be appreciated that the maps 600 and 650 are highly regular shapes when maps of actual police service areas and other territories may have highly irregular shapes. Notwithstanding, the maps 600 and 650 represent how information derived from call-for-service data may be visually represented on one or more maps of an area of interest.

For example, consider that a report is requested for the area of interest represented by the maps 600 and 650 that relate to sale or distribution of a particular type of narcotics. Based on the previously described pre-processing, one or more supplemental classifiers indicating occurrence of such incidents may have been associated with individual call-for-service data for a number of calls-for-service. Similarly, one or more supplemental classifiers may have been associated with individual call-for-service data to associate data for an individual call-for-service with a particular patrol area or other block location, as previously described with reference to FIG. 3. The map 600 of FIG. 6A may represent call-for-service data associated with one or more supplemental classifiers indicative of sale of the particular type of narcotic that were identified as occurring in the "LATE NIGHT" time range, while the map 650 of FIG. 6B may represent similar incidents occurring in the "EARLY MORNING" time range.

The maps 600 and 650 may use symbols, colors, or some other indicia to represent the number of calls-for-service meeting the criteria specified by the query or the request for a report. Thus, for example, the map 400 may represent within an area of interest the number of calls-for-service reporting incidents for which the calls-for-service were associated with the particular type of illegal narcotic transactions in the LATE NIGHT time range. A "+" symbol may indicate a number of such calls-for-service received, a "++" symbol may indicate a higher number of such calls-for-service received, and a "+++" symbol may indicate a still higher number of such calls-for-service received. Thus, in the LATE NIGHT time range, a highest number of calls-for-service related to the criminal activity of interest occurred in sections 612 and 614 which, as previously described, may include particular neighborhood blocks or patrol areas. A lesser number of calls-for-service were reported in sections 616 and 618. By contrast, the map 650 shows only a single section 672 in which calls-for-service associated with a supplemental classifier for this type of criminal activity were reported during EARLY MORNING hours.

The reports generated, in the forms of maps 600 and 650, may be used in any number of ways. For example, police patrols or other operations may be planned so that, in the future, more patrol resources are directed to sections 612 and 614 during the LATE NIGHT time range, with some resources assigned to patrol section 616 and, when resources are available, section 618 (for which the least number of such calls-for-service were received). By contrast, not as many resources should be dedicated to patrolling for this type of criminal activity during the EARLY MORNING time range, when fewer calls-for-service have been associated with one or more supplemental classifiers indicating this type of criminal activity. Moreover, if any patrol resources were dedicated to patrolling for the particular criminal activity of interest, the map 650 would indicate that the resources should be directed to section 672, where there is some history of calls-for-service that have been associated with this criminal activity.

The maps 600 and 650 may represent any identified type of criminal activity or harm that may be identified by the supplemental classifiers associated with the call-for-service data. For example, instead of representing illegal narcotics transactions, the maps 600 and 650 may represent calls-for-service that have been associated with automobile thefts, home burglaries, muggings, or any types of activity. Accordingly, resources directed to patrolling for these types of crime may be assigned in the sections of interest at the times where the calls-for-service associated with these types of crime have been prevalent in the past. The maps 600 and 650 may represent calls-for-service that have been associated with assaults on responding police officers such that, in the future, police officers responding to such calls-for-service may be apprised of the risk or the resources dispatched may be assigned based on the potential risk. In sum, with such reports reflecting a number of calls-for-service associated with a particular activity or risk in the past, in the future, resources may be assigned and measures may be taken to provide an appropriate response.

FIG. 7 shows a graphical report 700 that may be generated in response to a query or a request for report that specify criteria met by one or more supplemental classifiers associated with calls-for-service. In addition to generating maps, such as previously described with reference to FIGS. 6A and 6B, reports may be generated for a selected region of interest or section to show a number of associated calls-for-service occurring over time. For one example, the graphical report 700 may show a number of calls-for-service 710 associated with a particular supplemental classifier for each of a number of periods 720. The graphical report 700 thus may provide a visual representation of how the activity represented by one or more associated supplemental classifiers varies with time of day, day of the week, or another period of time or range of time.

For example, periods D 734 and E 736 are associated with the highest number of calls-for-service associated with one or more supplemental classifiers. Accordingly, resources to address activities represented by the one or more supplemental classifiers are most needed during periods D 734 and E 736 in the area represented by the graphical report 700. On the other hand, successively fewer calls-for-service associated with the one or more supplemental classifiers that meet the stated criteria were received during periods C 732, B 730, A 729, and F 737 and G 738. Thus, successively fewer resources may be required to address such activities during corresponding future periods.

While the graphical report 700 of FIG. 7 shows a bar graph to represent a number of calls-for-service associated with one or more supplemental classifiers that meet criteria specified by a query or request for report, any type of graphical or non-graphical report may be generated. Line graphs, pie charts, histograms, tables, or any other form of report may be generated from the supplemented call-for-service data based on queries that may retrieve call-for-service data that meet the stated criteria.

Figure 8:
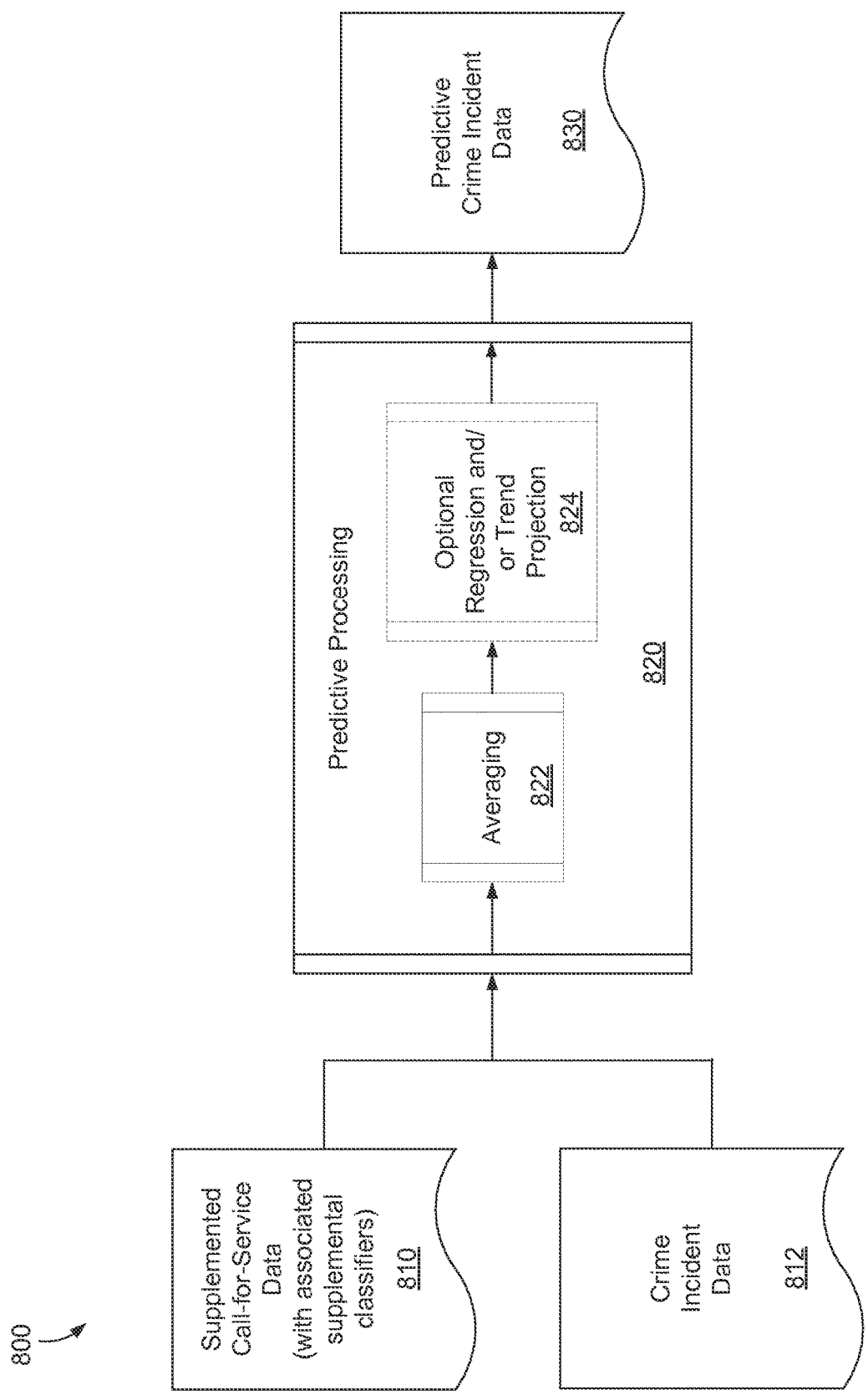
FIG. 8 is a flow diagram of a method of predictive processing to generate predictive crime incident data based on supplemented call-for-service data and crime incident data collected from past calls-for service and crimes, respectively.

FIG. 8 is a flow diagram 800 of a particular embodiment of a method to generate predictive models of crime. The method 800 receives supplemented call-for-service data 810, in which the original call-for-service data is associated with one or more supplemental classifiers, and crime incident data 812 as previously described with reference to FIGS. 3-5. The supplemented call-for-service 810 and crime incident data 812 is then subjected to predictive processing 820. In a particular embodiment, the predictive processing 820 performs an averaging 822 of the call-for-service data 810 so as to identify those areas and/or times at which varying numbers of calls-for-service for supplemental classifiers have been received and for which the crime incident data 812 shows the occurrence of crimes. Optionally (as reflected by dashed lines), at 824, regression and/or trend projection may be performed to augment the averaged call-for-service data, as previously described. The output of the predicting processing 820 is predictive crime incident data 830, such as the model 950 of FIG. 9C, as shown below.

FIG. 9A is a map 900 of call-for-service data that has been associated with a specified supplemental classifier, such as the "substance use" supplemental classifier associated with some calls-for-service originally classified as "disorderly conduct" calls-for-service, as described with reference to FIG. 4. The map 900 is presented as a grid, with sections 910 representing a selected geographical range that may correspond, for example, to a range of two to four city blocks. Data for individual calls-for service are assigned to a range that corresponds to the mapped sections 910. In response to a query entered by an analyst, such as the analyst 190 using the workstation 180 of FIG. 1, or generated automatically by a standard report generator. The query or report may be to tabulate the number of calls-for-service associated with a specified supplemental classifier over a preceding period of time, such as one-month, six-months, etc. The number of "+" symbols represents a relative quantity of the calls-for-service received over that period. It will be appreciated that the number of "+" symbols is one way of representing the number of calls-for-service received; other symbols, colors, or other visual indicia also may be used. Thus, embodiments of the disclosure may be used for reporting of past numbers of calls-for-service and the incidents that provoked the calls-for-service. For illustration, the map 900 shows calls-for-service associated with a particular supplemental classifier to have occurred in three segments: segments 912, 914, and 916. The symbols presented indicate that the most calls-for-service related to the supplemental classifier were placed in segment 914; a second greatest number of calls-for-service were placed in segment 916; the fewest calls-for-service (of segments for which such calls-for-service were logged) were placed in segment 912.

Referring to FIG. 9B, the historical call-for-service data also may be used predictively in conjunction with crime incident data such as shown in the map 920, for example, to generate a predictive model of forecasted crime for the next month or months. In other words, an average of calls-for-service associated with a specified supplemental classifier from the calls-for-service data 900 and an average of the crime incident data 920 in particular sections 910 (FIG. 9A) may be used to predict how many crimes of a specific type may be made over the following month or months.

FIG. 9C shows a predictive model, in the form of a map 950, based on the historical call-for-service data and crime incident data. Using the historical data—using supplemental classifiers assigned as previously described, segment 964 and 966 include a symbol indicating a highest predicted number of crimes of a specified type. Other segments, such as segments 962 and 968, do not show a predicted incidence of crime that is as high. The map 950 may include adjustments to project an increase in the rate of crime, a decrease in the rate of crime, or no change in the rate of crime. Any changes in rate may be based on hypothetical projections, empirical studies, or trend analysis based on the call-for-service data 900 and the crime incident data 920.

Using the predictive data included in the map 950, law enforcement agencies have some idea of what volume of crime to be received from the various segments. As a result, law enforcement agencies may choose to assign patrol officers or patrol units to patrol the segments 964 and 968, 966, or 962 (in that order of priority). As a result, patrol officers may be able to respond proactively to crime, thus improving chances of catching perpetrators, preventing consequential harm or even deterring occurrence of crimes by the officers' presence. Note that the map or model 950 representing an expected number of crimes may be correlated with landmarks or geographical points of reference, such as a highway 970 or a park or pond 980 to facilitate analysis of why incidents occur in those locations or, at least, to assist in dispatching responding personnel to readily identifiable locations.

The map or model 950 may be generated for different times of day (including ranges of time, such as early morning, late night, etc.). The model may be generated for particular days of the week (e.g., one or more weekend evenings) or particular times of the month (e.g., the end of the month, when many people are paid). The model 950 may be generated for one supplemental classifier, or multiple supplemental classifiers. The model 950 may be generated in a number of ways. The model 950 may be generated strictly based on a rolling average of a specified number of preceding weeks, months, or years. Alternatively, regression or trend analysis may be applied to the data for a preceding number of periods to generate an extrapolated number of crimes on identifiable trends. Similarly, a growth factor may be applied to the historical data to assume an increase in the number of criminal incidents based on the calls-for-service previously received or the incidents of crime previously recorded.

Figure 10:
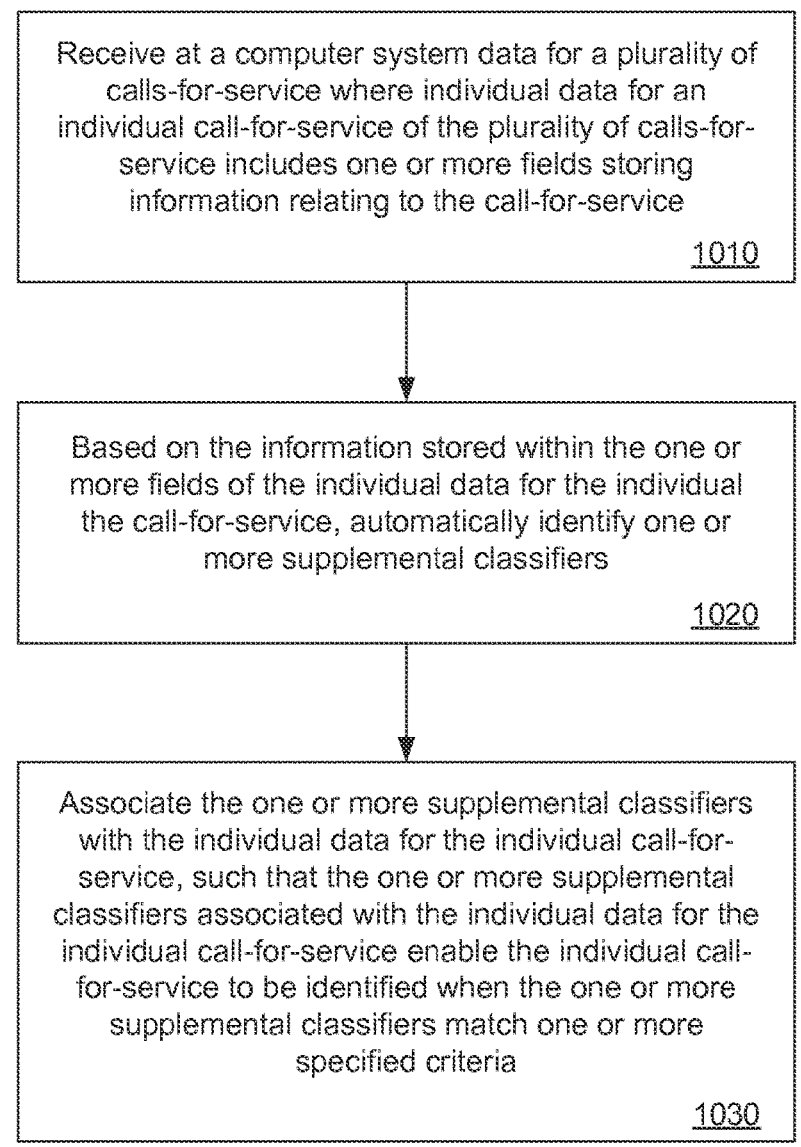
FIG. 10 is a flow diagram of an embodiment of a method performable by a computing system to associate call-for-service data with one or more supplemental classifiers to facilitate queries and reports for calls-for-service relating to activities of interest.

FIG. 10 is a flow diagram of a particular embodiment of a method 1000 performable by a computing system to associate call-for-service data with one or more supplemental classifiers to facilitate queries and reports for calls-for-service relating to activities of interest. At 1010, at a computer system, data for a plurality of calls-for-service is received where individual data for an individual call-for-service of the plurality of calls-for-service includes one or more fields storing information relating to the call-for-service. The computer system may include the computer system 140, as described with reference to FIG. 1, in which call-for-service data is stored using a capture system such as described with reference to FIG. 3. At 1020, based on the information stored within the one or more fields of the individual data for the individual the call-for-service, one or more supplemental classifiers are automatically identified. As described with reference to FIG. 3, empirical study of call-for-service data may identify criminal activities or other undesirable activities that occurred in relation to incidents reported in past calls-for-service may be identified. Based on identifying terms or phrases captured in the call-for-service data, calls-for-service that indicate the occurrence of such criminal activities may be automatically identified using natural language processing, as described with reference to FIG. 3. At 1030, the one or more supplemental classifiers are associated with the individual data for the individual call-for-service. Association of the supplemental classifiers with individual data for the individual calls-for-service enables individual calls-for-service to be identified when the one or more supplemental classifiers match one or more specified criteria. As a result, reports as described with reference to FIGS. 6A, 6B, 7, and 9A through 9C may be generated that may be helpful in allocating law enforcement resources and in other analysess.

FIG. 11 is a flow diagram of another particular embodiment of a method 1100 performable by a computing system to associate call-for-service data with one or more supplemental classifiers to facilitate queries and reports for calls-for-service relating to activities of interest. At 1110, at a computer system data for a plurality of calls-for-service is received where individual data for an individual call-for-service of the plurality of calls-for-service includes one or more unstructured fields storing information relating to the call-for-service. The computer system may include the computer system 140, as described with reference to FIG. 1, in which call-for-service data is stored using a capture system such as described with reference to FIG. 3 where unstructured fields are provided to capture narrative data regarding an incident reported in a call-for service. At 1120, based on information stored within the one or more unstructured fields, one or more supplemental classifiers are automatically identified. As part of identifying the one or more supplemental classifiers, at 1130, the information stored within the one or more unstructured fields is analyzed using natural language processing. As a further part of identifying the one or more supplemental classifiers, at 1140, the one or more supplemental classifiers are identified based on one or more terms potentially stored in the one or more unstructured fields that have been empirically determined to indicate relevance of the one or more supplemental classifiers. The parsing of the call-for-service data using natural language processing and identification of supplemental classifiers based on empirically-identified terms and phrases is described with reference to FIG. 3. At 1150, the one or more supplemental classifiers are associated with the individual data for the individual call-for-service in supplemented call for service data. Association of the supplemental classifiers with individual data for the individual calls-for-service enables individual calls-for-service to be identified when the one or more supplemental classifiers match one or more specified criteria. As a result, reports as described with reference to FIGS. 6A, 6B, 7, and 9A through 9C may be generated that may be helpful in allocating law enforcement resources and in other analysess.

FIG. 12 is a flow diagram of a particular illustrative method 1200 of a process for performing predictive analysis from historical call-for-service data. At 1210, at a computer system, supplemented call-for-service data is accessed. The call-for-service data includes individual data for each of a plurality of calls-for-service in which the individual data has been associated with one or more supplemental classifiers based on the information stored within one or more fields of the individual data. The original call-for-service data is supplemented with the supplemental classifiers to generate the supplemented call-for-service data, or back-end data, as previously described with reference to FIGS. 3, 4, and 5. At 1220, crime incident data is accessed. The crime incident data, as described with reference to FIG. 1, includes data regarding the reporting and/or investigation of previously-committed crimes. In a particular embodiment, the crime incident data is at least partially coextensive with the supplemented call for service data in geographical and temporal coverage. At 1230, a selection is received for one or more types of crime represented in at least one of the one or more supplemental classifiers and the crime incident data. At 1240, a selection is received of one or more particular locations where crimes might have occurred and/or may occur. At 1250, a selection is received at of one or more times of interest or ranges of time of interest. Accordingly, reports may be generated for selected crimes or types of crimes that may have been reported (or identified from assigned supplemental classifiers in call-for-service data) in selected locations and at selected times or in selected time ranges.

At 1260, one or more averages are generated for the one or more types of crime incidents represented in the at least one of the one or more supplemental classifiers and the crime incident data for the particular locations and the times of interest or ranges of time of interest. Thus, a computing system may tabulate totals of the numbers of crimes of the specified types and at the specified locations and times. Then, the totals may be averaged to determine a past rate of occurrence of crimes meeting the specified criteria. As described with reference to FIGS. 9A and 9B, the historical data to be averaged may be call-for-service data associated with a particular supplemental classifier or crime incident data classified as a particular type of criminal incident. That data may be averaged for selected geographical ranges, such as the segments 910 and 930 of FIGS. 9A through 9B, respectively, where the geographical ranges, for example, may span two through four city blocks. The data selected and averaged also may be for particular times of the day, of the week, or of the month, in recognition of how certain calls-for-service tend to be made at night, on weekends, etc. At 1270, a predictive model may be generated based on the one or more averages, where the model is configured to be predictive of future crime incidents of the specified types and at the specified locations and times. Thus, as shown in FIG. 9C, a map or other output may be generated that depicts locations where future crimes of particular types may be anticipated to occur at particular locations and in particular ranges of time. Such maps may be used in the allocation of patrol resources to potentially deter or prevent the commission of crimes, or to be able to quickly respond to the potential occurrence of such crimes.

While embodiments have been has been described herein in reference to specific aspects, features and illustrative embodiments of the disclosure, it will be appreciated that the utility of the embodiments is not thus limited, but rather extends to and encompasses numerous other variations, modifications and alternative embodiments, as will suggest themselves to those of ordinary skill in the field, based on the disclosure herein. Correspondingly, the embodiments as hereinafter claimed are intended to be broadly construed and interpreted, as including all such variations, modifications and alternative embodiments, within their spirit and scope.

What is claimed is:

1. A computer-implemented method performable by a computer system comprising:
    receiving, at a computer system, data for a plurality of emergency calls-for-service from an emergency response facility, wherein individual data for an individual call-for-service of the plurality of calls-for-service includes one or more fields storing information relating to the call-for-service, wherein the individual call-for-service data includes non-structured data input by an operator at the emergency response facility in response to receiving an emergency call-for-service, wherein the individual data for an individual call-for-service also includes structured data input by the operator;
    based on the information stored within the one or more fields of the individual data for the individual call-for-service, automatically identifying one or more supplemental classifiers by using natural language processing of the individual call-for-service data; and
    associating the one or more supplemental classifiers with the individual data for the individual call-for-service when the one or more supplemental classifiers match one or more specified criteria,
    wherein the one or more supplemental classifiers further classify one of the structured data input by the operator,
    wherein the one or more supplemental classifiers are associated with the individual call-for-service data in supplemented call-for-service data, and the supplemented call-for-service data is stored in one of a relational database or at the computer system receiving the data for the plurality of calls-for-service.

2. The computer-implemented method of claim 1, wherein the plurality of calls-for-service further include a plurality of non-emergency calls for service.

3. The computer-implemented method of claim 1, wherein the information relating to the individual call-for-service is presented by a caller making the individual call-for-service.

4. The computer-implemented method of claim 1, wherein the information relating to the individual call-for-service is stored in the one or more fields contemporaneously with receiving of the individual call-for-service.

5. The computer-implemented method of claim 1, wherein the one or more fields include one or more structured fields configured to receive a specified form of information and one or more unstructured fields configured to store narrative information.

6. The computer-implemented method of claim 5, wherein one or more of the structured fields in the individual data for the call-for-service includes at least one classifier assigned by a call-for-service operator receiving the individual call-for-service to describe a nature of the incident that is subject of the individual call-for-service.

7. The computer-implemented method of claim 5, wherein one or more of the structured fields in the individual data for the call-for-service further includes one or more of:
    a location of the incident;
    a time of the incident; and
    a type of the incident.

8. The computer-implemented method of claim 5, wherein the narrative information stored in the one or more unstructured fields are configured to receive information that the one or more structured fields are not configured to accommodate.

9. The computer-implemented method of claim 1, wherein at least one field of the one or more fields includes a string variable and at least one supplemental classifier represents the string variable with a structured variable, wherein the structured variable facilitates a query on one of a specified value and a specified range of the structured variable.

10. The computer-implemented method of claim 9, wherein the string variable includes one of:
    a time and the structured variable includes a time variable, wherein the time variable facilitates responding to a query for calls-for-service received one of at a specified time and in a specified range of times;

a date and the structured variable includes a date variable, wherein the date variable facilitates responding to a query for calls-for-service received one of on a specified date and in a specified range of dates; and a date and the structured variable includes a day of the week variable, wherein the day of the week variable facilitates responding to a query for calls-for-service received one of on a specified day of the week and in a specified range of days of the week.

11. The computer-implemented method of claim 1, wherein the at least one supplemental classifier includes a range variable, wherein the range variable represents a range of values potentially represented in a particular field of the one or more fields, and wherein the range variable facilitates a query for calls-for-service corresponding to a value within the range of values.

12. The computer-implemented method of claim 11, wherein the range variable includes a time range variable spanning a range of times, wherein the time range variable facilitates responding to a query for calls-for-service received within a particular range of times.

13. The computer-implemented method of claim 11, wherein the time range variable includes a plurality of ranges including one or more of a morning, a portion of a morning, an afternoon, a portion of an afternoon, an evening, a portion of an evening, a night, and a portion of a night.

14. A computing server configured for:
receiving data for a plurality of emergency calls-for-service from an emergency response facility, wherein individual data for an individual call-for-service of the plurality of calls-for-service includes one or more fields storing information relating to the call-for-service, wherein the individual call-for-service data includes non-structured data input by an operator at the at the emergency response facility in response to receiving an emergency call-for-service, wherein the individual data for an individual call-for-service also includes structured data input by the operator;

based on the information stored within the one or more fields of the individual data for the individual call-for-service, automatically identifying one or more supplemental classifiers by using natural language processing of the individual call-for-service data; and associating the one or more supplemental classifiers with the individual data for the individual call-for-service when the one or more supplemental classifiers match one or more specified criteria, wherein the one or more supplemental classifiers further classify one of the structured data input by the operator, wherein the one or more supplemental classifiers are associated with the individual call-for-service data in supplemented call-for-service data, and the supplemented call-for-service data is stored in one of a relational database or at the computer system receiving the data for the plurality of calls-for-service.

15. The server of claim 14, wherein the plurality of calls-for-service further include a plurality of non-emergency calls for service.

16. The server of claim 14, wherein the information relating to the individual call-for-service is presented by a caller making the individual call-for-service.

17. The server of claim 14, wherein the information relating to the individual call-for-service is stored in the one or more fields contemporaneously with receiving of the individual call-for-service.

18. Computer control code configured to operate on a computing device and configured to direct the computing device to:
receive, at a computer system, data for a plurality of emergency calls-for-service from an emergency response facility, wherein individual data for an individual call-for-service of the plurality of calls-for-service includes one or more fields storing information relating to the call-for-service, wherein the individual call-for-service data includes non-structured data input by an operator at the at the emergency response facility in response to receiving an emergency call-for-service, wherein the individual data for an individual call-for-service also includes structured data input by the operator;

based on the information stored within the one or more fields of the individual data for the individual call-for-service, automatically identify one or more supplemental classifiers by using natural language processing of the individual call-for-service data; and associate the one or more supplemental classifiers with the individual data for the individual call-for-service when the one or more supplemental classifiers match one or more specified criteria, wherein the one or more supplemental classifiers further classify one of the structured data input by the operator, wherein the one or more supplemental classifiers are associated with the individual call-for-service data in supplemented call-for-service data, and the supplemented call-for-service data is stored in one of a relational database or at the computer system receiving the data for the plurality of calls-for-service.

* * * * *